UNITED STATES PATENT OFFICE.

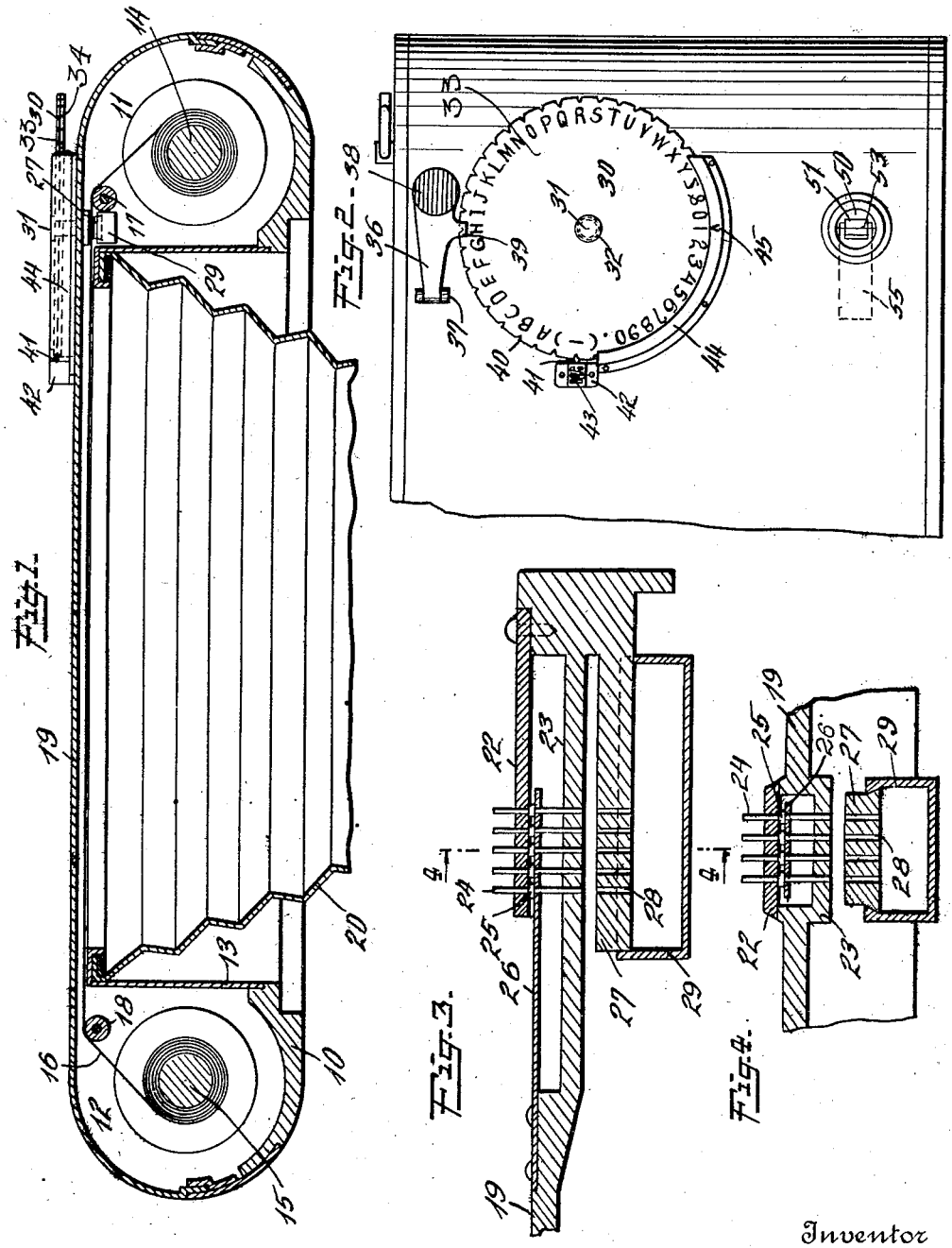

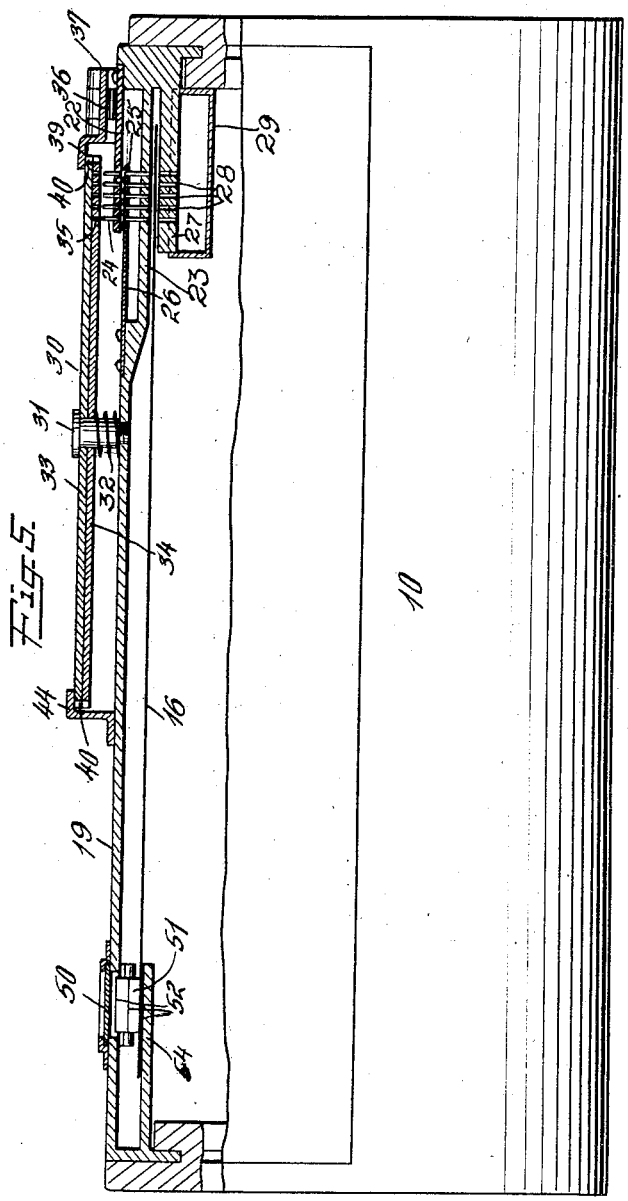

HYLA FREDERICK MAYNES, OF GAINES, PENNSYLVANIA.

MECHANICAL-INSCRIPTION CAMERA.

1,274,302.

Specification of Letters Patent.

Patented July 30, 1918.

Application filed April 26, 1917. Serial No. 164,715.

*To all whom it may concern:*

Be it known that I, HYLA FREDERICK MAYNES, a citizen of the United States, residing at Gaines, in the county of Tioga, State of Pennsylvania, have invented certain new and useful Improvements in Mechanical-Inscription Cameras; and I do hereby declare the following to be a full, clear, and exact description of the invention, such as will enable others skilled in the art to which it appertains to make and use the same.

The present invention relates to photographic cameras, and more particularly to an apparatus for applying identification marks to the film of the camera.

In the use of cameras in which exposures are taken on a roll of sensitized film it is desirable to be able to place upon each section of the film on which an exposure has been made a permanent record of the subject which has been photographed. This record may consist of a description of the subject or some characteristic or code designation by which the particular section of the film may afterward be identified when it is removed from the camera and developed.

Various arrangements whereby the user of a camera may make a permanent record upon the film have been proposed and are in use, but they are photographic in their nature, depending upon the sensitive properties of the film and requiring subsequent development to preserve them. With some of such arrangements an extra layer of carbon paper superposed upon the film is required in addition to the usual opaque backing strip.

One is often compelled by circumstances under which the camera is being used to take exposures in rapid succession, with no opportunity to apply identification marks to the film between each exposure. In such cases it will be found convenient if means are provided whereby the designation or permanent record may be applied after the film has been removed and developed. This cannot be done by the so-called autographic cameras referred to above, in which the identification marks must be photographed upon the film before it is developed.

The present invention seeks to obviate the disadvantages of the existing methods of producing permanent records on photographic films by the provision of mechanism of simple construction and reliable operation whereby any desired identification characters may be permanently impressed on the film wholly without photographic exposure of any portion of the film. To this end the desired characters are impressed upon the film by physical means such as dies or punches in such manner as to form a permanent record which cannot be obliterated without actual destruction of the portion of the film to which it has been applied. The invention also lends itself for use in those cases where identification marks cannot be applied until after the film has been removed, for the apparatus of the invention may be used for marking or perforating a film after it has been taken from the camera and either before or after development.

Other objects and advantages of the invention will be apparent from a detailed description of one preferred embodiment thereof as illustrated in the following drawings, in which—

Figure 1 represents a longitudinal section through the film-holding portion of a camera, the remaining portions not being shown since they may be of any well known construction; Fig. 2 is an elevation of a portion of the back of the camera casing, showing the index plate and lever of the marker; Fig. 3 is an enlarged sectional view showing the method of mounting the perforating punches or pins; Fig. 4 is a cross-sectional view along the line 4—4 of Fig. 3; Fig. 5 is a view partly in section through the back of the camera in a direction transverse to that of Fig. 1 and on a larger scale; Fig. 6 is a detailed view of a portion of the index plate or mechanism for selectively controlling the perforating punches; and Fig. 7 is a view of a piece of photographic film having characters applied thereto.

Referring now to the drawings, in which similar reference characters denote similar parts throughout the several views, 10 represents the body portion of the casing of a camera of the folding type. This casing has roll-holding chambers 11 and 12 containing spools 14 and 15 respectively, 14 being the spool upon which the exposed film is to be wound, while 15 is the spool for holding the unexposed film. The film itself is shown at 16 passing over rollers 17 and 18 and immediately beneath the removable back 19. A portion of the usual folding bellows of the camera is shown at 20 attached to the frame 13 which lies between the roll-holding chambers and defines the exposure opening in the usual way. Since the lens, shutter and other devices located at the forward end of the bellows form no part of the present invention they have been omitted for the sake of simplicity.

For the purpose of impressing, stamping or perforating the desired characters on the film wholly without any photographic action, and, if desired immediately after exposure of the film section which is to be marked, I propose to use dies or punches coöperating with an anvil on which the film part to be marked is supported. These dies or punches may be given any desired form such as letters, words or characters of any kind, but I prefer to use the hereinafter described assemblage of pins and index plate by means of which any one of a large number of letters and marks, such as the ordinary letters of the alphabet and the common punctuation marks, may be formed by perforations in the films.

Near one edge and at one end of the removable back 19 is formed a channel portion as shown most clearly in Figs. 3 and 4, and which houses an operating spring 26 which normally tends to lift the perforating pins or punches 24, each of which is provided with a shoulder 25 overlying the spring 26. These pins or punches 24 play in and are guided by apertures, which they closely fit, in the underlying and overlying walls 23 and 22 of the channel, as shown in Figs. 3, 4 and 5. On the inside of the back at the edge thereof, and extending immediately beneath the pins and punches 24, is an anvil member 27 containing apertures 28 registering with the apertures in the walls 22 and 23 of the channel. A box or receptacle 29 is adapted to be retained in place upon the anvil for collecting the pieces of film that are punched out by the pins during the perforating operation.

For selectively operating the pins to produce any desired characters an index plate 30 is mounted upon a hub 31 projecting from the back of the camera and a spring 32 holds the index plate against a shoulder on the end of the hub. This index plate may conveniently be composed of two parts, a solid outer plate 33 which carries near its edge designations corresponding to the characters which may be selectively punched into the film by the perforating pins, and an inner plate 34 having apertures or cut-away portions 35 corresponding to those of the pins which it is intended shall not be actuated when perforating any given character upon the film. In Fig. 6 the apertures extending through the plate are shown in solid lines while the ends of the pins which engage the plate are indicated in dotted lines. For the purpose of moving the index plate inwardly upon its supporting hub to depress the selected pins into perforating position a lever 36 is provided. This lever is pivoted to the back of the camera at 37 and carries a push button 38 by which it may be actuated. It also has an offset portion 39 adapted to fit over the index plate to depress the same to actuate the perforating pins.

In order to retain the index plate in any desired position of adjustment its periphery is provided with notches 40 coacting with a pin 41 mounted in a bearing 42 attached to the back of the camera and spring-pressed by a spring 43 toward the notch-engaging position. A guard 44 attached to the back of the camera covers a part of the edge of the index plate and upon this guard is an index mark 45 which bears such a relation to the characters upon the plate and the apertures which control the selective operation of the perforating pins as to show by its position which one of the series of apertures is in position to control the action of the perforating pins. In the particular arrangement shown herein the corresponding character on the inner plate 34 is arranged diametrically opposite to the designation of the same character placed upon the outer plate 33, but any other relationship of the characters on the inner and outer plates may be used as desired.

Cameras of the general type illustrated herein are provided with a transparent window usually formed of ruby glass through which may be seen a number or letter stamped on the paper backing of the roll of film in order to show the user when each section of the film is in proper position for exposure. The present invention makes use of the same arrangement by providing an aperture at any convenient part of the back of the camera and this aperture is covered by a window 50 of red glass. In addition the invention provides a means associated with the window for giving an indication of the forward movement of the film that is required to prevent the perforations of one character from overlapping the perforations of another character which it may be desired to combine with the first. For this purpose there is mounted immediately below the window 50 a roller 51 which has preferably a white surface upon which is drawn a series of longitudinal index lines 52. A coöperating index line 53 is also traced across the window 50. The roller 51 is moved by the film as it is drawn through the camera and in order that the roller may be held against the film the roller is carried by a spring 55 (Fig. 2) tending to hold it away from the back and against the film. Furthermore there may be provided, if desired beneath the window a shelf or anvil 54 projecting from the edge of the back and against which the roller presses the film.

The roller itself is preferably of such a diameter that one complete rotation measures the amount of film that must be drawn through the camera to permit a given number of properly spaced successive characters to be applied to the film by the action of the perforating pins, the spaces between the index lines 52 on the roller 51 each representing a character space on the film.

The camera described above is operated in the usual manner by winding the film from the roller 15 upon the roller 14 for successive exposures, the correct position of the film being determined by the index characters which may be seen through the window 50 and beneath the roller 51, which is small enough not to hide the number. When, after an exposure, it is desired to apply characters to the film to designate the picture which has been taken the film should be drawn along so that the roller 51 is rotated to bring one of the lines 52 thereon into registry with the index line 53 on window 50. The index plate 30 is then manipulated to bring the desired character into position opposite the index 45, the index plate being held in this position by the spring-pressed pin 41 engaging one of the notches in the periphery of the plate. When this adjustment of the plate has been made there will be above the outer ends of the pins 24 a series of perforations or cut-away portions corresponding to the pins which should not be actuated to produce the desired character. The lever 36 is thereupon depressed by hand to move the index plate inwardly along its hub 31. The index plate will pass over certain of the pins but others will be depressed to perforate the film and run into the anvil 27, thus applying the desired character to the film. Upon releasing lever 36 the spring 32 will cause the index plate to assume its normal position while the spring 26 will restore the actuated pins to their normal positions. If it be desired to apply a second character to the film the latter is drawn through the camera sufficiently to cause the roller 51 to make a part revolution, bringing the next index line 52 into registration with the line 53 on window 50. By this operation the film will have been moved sufficiently to permit a second character to be perforated therein without overlapping the character which has already been applied. Thereafter the index plate is adjusted to bring the second desired character into place so that the pins necessary to produce this character may be actuated by a subsequent manipulation of the lever 36. In this manner any number of characters may be applied to the film.

Preferably the perforated characters are applied to an exposed part of the film so that the characters will be clearly shown on the face of the prints made therefrom. If it is desired that the characters be not applied to the exposed part of the film the pins are arranged so near the edge of the film that they will cut through the latter at a point beyond that upon which the picture has been taken. It is evident however that the perforating apparatus may be arranged at any point on the back of the camera and if desired the spaces between successive index marks on the film may be great enough to allow for a number of perforations between the exposed sections of the film, in which case the perforating apparatus need not necessarily be arranged near the edge of the film, as shown in Fig. 5, but may be at some other portion thereof.

In the embodiment of the invention illustrated herein it is intended that a total of twenty pins shall be used and it is found in practice that the various characters comprising letters or numerals may be made up by selecting certain of these pins. In the portion of the index plate illustrated in Fig. 6 the letters are G, H and I. While twenty pins are as above stated, found sufficient for producing the characters with the necessary degree of accuracy, as many more may be used as desired within the limits of construction of the apparatus, which, of course, should be as compact and as light as possible in order not to add any considerable number of parts nor unnecessarily increase the weight of the camera to which it is applied.

While the perforating apparatus has been shown in operative position upon the camera with the intention that the designating marks should be punched in the film before it is removed from the camera, the apparatus may also be used for perforating the film after the same has been taken out of the camera. For this purpose the back 19 is removed and the film may be run through between the anvil and the back and the desired characters perforated into the film in a manner similar to the operation of the invention when the film is in place in the camera.

In the construction shown the anvil 27 and the ledge 54 are shown as extending on the inside of the film. In order to get the film into place between these members and the back it will be found most convenient to slip it in place when the back is removed by bringing the anvil and the ledge near the middle part of the span of the paper backing which is wound upon the roller 14 before the film itself is drawn into place. The back is then slipped along into its normal position and when the film is subsequently drawn into place for exposure it will pass through the channels formed between the anvil portion and the back and also between the ledge 54 and the roller 51.

While the invention has been illustrated in combination with a form of camera now in general use it is evident that it may be applied to any other form of camera or may, indeed, be applied apart from any camera structure without departing from the principle of the invention, since only changes in details are necessary to adapt it for use in other relationships than the particular one disclosed herein.

Although I prefer that the characters impressed upon the film should be by complete perforation thereof, it will be understood that some other physical deformation of the film less than actual perforation thereof may serve the purpose, and where the word "perforation" is used in the appended claims I intend it to include any such equivalent marking.

What I claim is:

1. A camera adapted to hold a photographic film, including means for causing forward travel of said film, and means for perforating successive portions of said film with identification marks of selective character.

2. The combination with a camera adapted to have a photographic film drawn therethrough, of means mounted on the camera by which any one of a number of identification marks may be impressed on said film by the perforation thereof.

3. A camera having a removable back and adapted to have a film drawn therethrough, means mounted on said back by which any one of a number of identification marks may be impressed on said film by perforation thereof.

4. A camera adapted to hold a photographic film, including a removable cover, a plurality of punching pins mounted on said cover, and means for selectively operating said pins to apply designation characters to the film.

5. A camera adapted to hold a photographic film, including a removable member attached to said camera, an anvil attached to said member and extending under the film, a series of perforating punches mounted on said member, an index plate for selectively controlling the operation of said punches, and means for actuating said plate to cause said punches to perforate said film.

6. A camera, including means for holding a photographic film, a removable member attached to the camera, guiding members associated with said movable member, a plurality of punches mounted in said guiding members, means for selectively operating said punches to perforate the film, and an anvil adjacent one of said guiding members and forming therewith a channel adapted to receive the film, said anvil being provided with apertures into which said punches enter after having perforated the film.

7. A camera, including means for holding a photographic film, a removable member, guiding members associated with the removable member, a plurality of punches mounted in said guiding members, means for holding the punches in inoperative position, means for selectively operating said punches to perforate the film, and means for restoring said operating means to normal position after each operation thereof.

8. In combination with a camera adapted to contain a photographic film, means for perforating said film comprising a plurality of punches, and means for selectively operating said punches to apply any desired identification marks to said film.

9. A camera adapted to hold a photographic film, including means for perforating said film with identification marks of any selected character and means for determining when successive portions of said film are brought into position to be perforated.

10. A camera adapted to receive a photographic film, including a removable cover, a plurality of perforating pins mounted on said cover, means for selectively operating said pins to apply designation characters to the film, and means mounted on said cover for indicating when the film is in position to have the characters perforated therein.

11. In a camera adapted to receive a photographic film, a removable cover attached to said camera, an anvil attached to said cover and extending under the film, a plurality of perforating punches mounted on said cover, an index plate for selectively controlling the operation of said punches, means for actuating said plate to cause said punches to perforate said film, a transparent window in said cover, an index on the window and a roller mounted beneath said window and provided with an index adapted to coöperate with the index on the window to show when the film is in position to have characters perforated therein.

12. A camera, including means for holding a roll of film, a removable cover, punching devices slidably mounted in said cover, an index plate rotatably mounted on said cover and provided with selectively arranged openings adapted to pass over some of said pins, and means for moving said index plate to cause the same to depress the other pins to perforate the film.

13. A camera, including means for holding a roll of film, a removable cover, a plurality of punches slidably mounted on said cover, an index plate rotatably mounted on said cover and provided with selectively arranged openings whereby said plate may pass over certain punches, a lever for actuating said index plate to cause the same to actuate the other punches to perforate the film, and means associated with said index plate for holding it in any desired position of adjustment during the operation of perforating the film.

14. A camera adapted to have a photographic film drawn therethrough, including means mounted on said camera by which any one of a number of identification marks may be impressed on said film by perforation thereof and means for catching and retaining the excised portions of the film.

15. A camera adapted to have a photographic film drawn therethrough, including means mounted on said camera by which any one of a number of identification marks may be impressed on said film by perforation thereof and a receptacle below the perforating means for retaining the excised portions of the film.

In testimony whereof I affix my signature.

HYLA FREDERICK MAYNES.